United States Patent [19]

Kubota

[11] Patent Number: 4,509,800

[45] Date of Patent: Apr. 9, 1985

[54] BRAKE PRESSURE CONTROL VALVE OF A DOUBLE PIPING SYSTEM

[75] Inventor: Hitoshi Kubota, Minami-ashigara, Japan

[73] Assignee: Nissan Motor Co., Ltd., Yokohama, Japan

[21] Appl. No.: 454,615

[22] Filed: Dec. 30, 1982

[30] Foreign Application Priority Data

Mar. 23, 1982 [JP] Japan .................................. 57-46120

[51] Int. Cl.³ ............................................... B60T 8/26
[52] U.S. Cl. ..................................... 303/6 C; 188/349
[58] Field of Search ............... 188/349; 303/6 C, 6 R, 303/84 A, 84 R; 60/591

[56] References Cited

U.S. PATENT DOCUMENTS

| 3,701,567 | 10/1972 | Shutt et al. | 188/349 |
| 4,269,453 | 5/1981 | Sawyer | 303/6 C |
| 4,284,308 | 8/1981 | Hayashida | 303/6 C |
| 4,317,598 | 3/1982 | Tandler | 303/6 C |
| 4,422,694 | 12/1983 | Schopper et al. | 303/84 A |

FOREIGN PATENT DOCUMENTS

| 0080650 | 6/1983 | European Pat. Off. |
| 2454650 | 11/1980 | France . |
| 1523802 | 9/1978 | United Kingdom . |

Primary Examiner—Bruce H. Stoner, Jr.
Assistant Examiner—Alvin Oberley
Attorney, Agent, or Firm—Schwartz, Jeffery, Schwaab, Mack, Blumenthal & Koch

[57] ABSTRACT

In a brake pressure control valve having two valve units arranged therein, there is disposed a free piston self-centering promoting arrangement. The arrangement comprises a shoulder portion of a hollow member which is retained in each valve unit to retain the substantially all essential parts in a casing, a radially outwardly projected portion of the free piston which is axially slidably received in the hollow plug with its outside end contacting with the pair, and an annular spring seat which supports one end of a biasing spring of the pressure control piston of the unit, wherein the spring seat is in abutment with both the shoulder portion and the radially outwardly projected portion at the same time when the free piston assumes its home position.

6 Claims, 2 Drawing Figures

BRAKE PRESSURE CONTROL VALVE OF A DOUBLE PIPING SYSTEM

BACKGROUND OF THE INVENTION

1. Field of the Invention

The present invention relates to a brake pressure control valve located in the outlet port of a master cylinder for controlling the brake pressure applied to the rear wheels of a motor vehicle, and more particularly to a brake pressure control valve adapted for use with a double piping type hydraulic braking system.

2. Description of the Prior Art

Various kinds of brake pressure control valves are known which control the brake pressure delivered to the rear wheels of the vehicle so that once the master cylinder pressure reaches a certain value (critical pressure), the brake pressure for the rear wheels thereafter increases at a lesser rate than the input pressure from the master cylinder. With this function, the dangerous skid phenomenon wherein the rear wheels are locked prior to the front wheels under braking of the vehicle is prevented.

Now, in order to assure safety of the vehicle, a so-called double piping type hydraulic braking sytem is widely employed nowadays, which includes two groups of braking systems so that even when one system fails to operate, the other system operates to brake the vehicle. X-piping system and J—J piping system are known as the double piping system.

When the double piping system is employed, two brake pressure control valves are necessary which are respectively mounted in the two (double) hydraulic braking system. Usually, these two control valves are assembled in a single housing to reduce mounting space and production cost. Furthermore, for such purpose, it is known to use a housing integrated with a tandem master cylinder.

However, most of the brake pressure control valves are constructed to employ the housing as an essential part thereof, so that operation of each control valve can not be expected until the valve is completely assembled in the housing. In fact, hitherto, the performance test of each valve has been carried out after assembling these two valves in the housing. Thus, when a defect is found in the assembled valve unit, it is necessary to take out the parts of the valves from the housing one by one in awkward manner. The disassembling work and next-necessitated reassembling work are quite troublesome and thus take much time.

One of the brake pressure control valves which are free of the above-mentioned drawbacks is disclosed in Japanese Patent Application Nos. 56-186220 & 56-186221. The valve disclosed therein comprises generally a housing integrated with a master cylinder, and two identical valve units coaxially and symmetrically arranged in the housing, wherein each of the valve units comprises a casing in which substantially all essential parts of the valve are housed, and a free piston means removably mounted to the casing in a manner to retain the essential parts in the casing. That is, each valve unit of the valve constitutes a finished device without using any parts of the housing. Thus, each valve unit can be independently pre-tested before being assembled in the housing. Even if trouble is found in the valve unit in the housing, the repair work requires only replacing the valve unit in trouble with new one, which is quite easy.

However, the improved valve as stated hereinabove still has a weak point in self-centering characteristics of the free pistons thereof which contribute to a so-called fail-safe function of the valve. In fact, when the brake pedal is rapidly released, there sometimes appears a pressure difference between the input pressures of the paired valve units causing displacement of the free pistons from their home (or neutral) positions. However, in the valve as mentioned above, rapid self-centering movements of the free pistons is not assured because of its inherent construction. The rapid self-centering is quite important because if the brake pedal is depressed with the free pistons being not centered, the brake pressures applied to the rear wheels become unbalanced thereby causing unstable braking of the vehicle.

SUMMARY OF THE INVENTION

Therefore, it is an essential object of the present invention to provide a brake pressure control valve which is free of the above-mentioned weak point.

According to the present invention, there is provided a brake pressure control valve for a double piping hydraulic braking system, which comprises a housing having a bore formed therein, a pair of substantially identical valve units coaxially and symmetrically arranged in the bore, each valve unit including a valve body, a pressure control piston and a spring which are constructed to produce a controlled outlet hydraulic pressure in accordance with the magnitude of a hydraulic pressure applied thereto, a pair of free pistons respectively associated with the paired valve units and contacting each other to be movable therewith, the free pistons supporting the associated valve bodies and one end of the associated springs to cause one of the valve units to produce, when the other valve unit fails to operate, an outlet hydraulic pressure which is equal to the applied pressure in magnitude, and a self-centering promoting means which causes each of the springs to apply no force to the corresponding free piston when the free piston moves away from its home position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
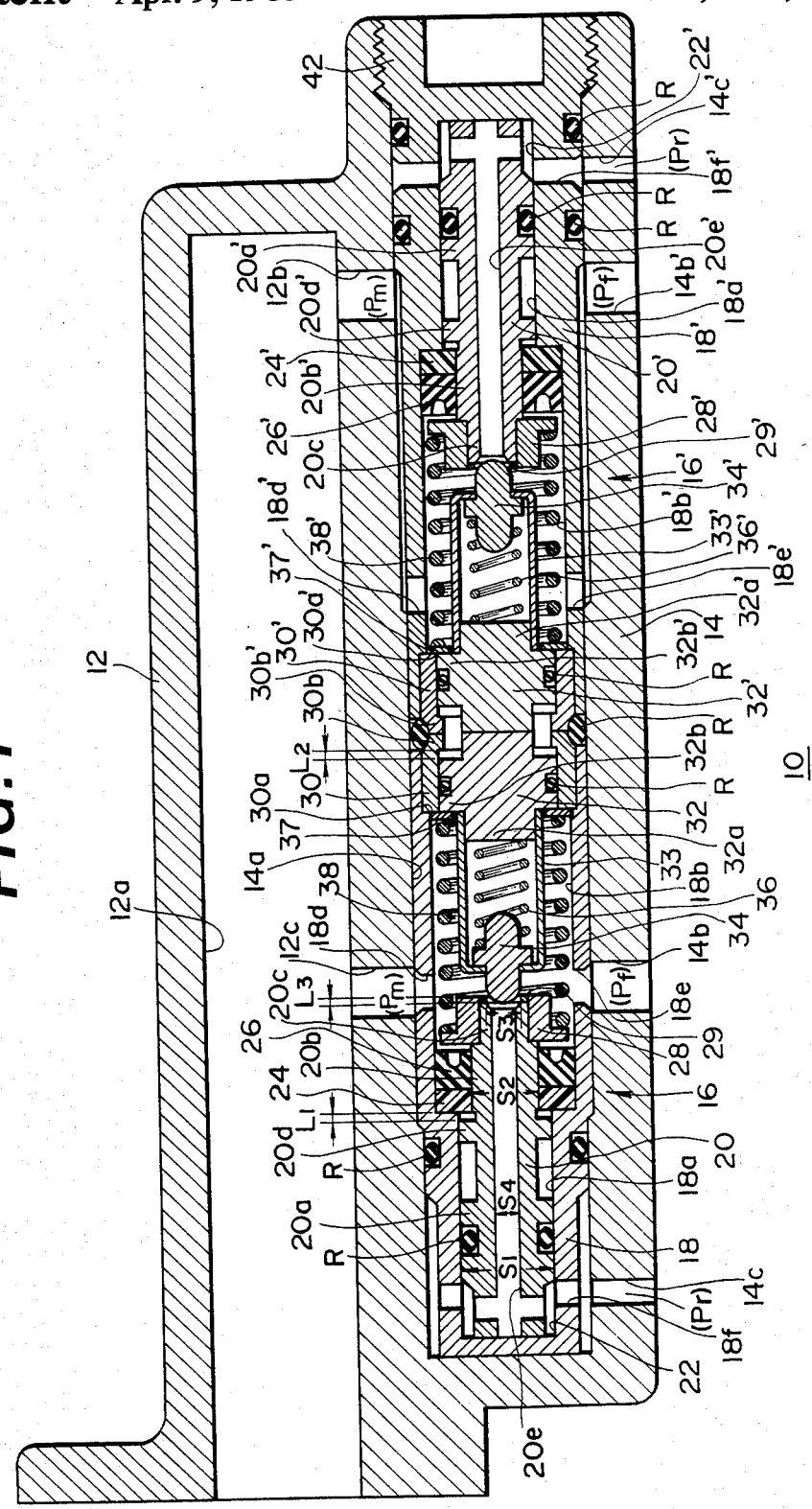
FIG. 1 is a longitudinally sectioned view of a brake pressure control valve according to the present invention.

Referring to FIG. 1 of the drawings, there is shown a brake pressure control valve 10 according to the present invention. The valve 10 is integrated with a conventional master cylinder 12. Although not shown in the drawing, primary and secondary pistons are operatively disposed in a bore 12a of the cylinder 12, so that upon depression of the brake pedal (not shown), a master cylinder pressure $P_m$ is produced equally at its outlet ports 12b and 12c in a conventional manner.

The brake pressure control valve 10 comprises an elongate housing 14 which is integrated with the body of the master cylinder 12. Within the straight bore 14a of the housing 15, first and second proportioning valve units 16 and 16' are arranged coaxially and symmetrically to each other. Since these two valve units 16 and 16' have substantially identical constructions, the following description will be directed to only the first valve unit 16. The corresponding parts and portions of the second valve unit 16' are identified by the same reference numerals but with a prime.

The valve unit 16 comprises a valve casing 18 sealingly disposed in the left half of the straight bore 14a. The valve casing 18 has therein a blind bore comprising aligned smaller and larger diameter bore portions 18a and 18b which are merged. Designated by references R are seal rings.

A pressure control piston 20 is slidably disposed in the bore of the casing 18 with its largest diameter portion 20a sealingly received in the smaller diameter bore portion 18a of the casing 18. With this, an outlet chamber 22 is defined at the bottom of the bore portion 18a. (In the valve unit 16', the outlet chamber 22' is defined in a plug 42 which will be described hereinafter.) A medium diameter portion 20b of the piston 20 is slidably and sealingly supported by both a holder 24 and a seal member 26 which are retained in the larger diameter bore portion 18b of the casing 18. The piston 20 has at its right end (left end in case of the unit 16') a smallest diameter portion 20c which is exposed to the larger diameter bore portion 18b. In addition, the piston 20 is formed with an annular ridge 20d between the largest and medium diameter portions 20a and 20b, which is engageable with the holder 24 to limit the axial displacement of the piston 20 relative to the holder 24. The piston 20 is further formed with an axially extending through passage 20e which connects the outlet chamber 22 with the larger diameter bore portion 18b. An annular spring seat 28 is removably mounted on the smallest diameter portion 20c of the piston 20. A valve seat 29 is fixed to the mouth of the annular spring seat 28.

An annular hollow member 30 is retained in the open end of the casing 18. For the reasons which will become apparent as the description proceeds, the member 30 has such a thickness as to form a shoulder portion 30a projected inwardly of the larger diameter bore portion 18b, and the member 30 has at its axially outside end a radially inwardly projected flange portion 30b. A free piston 32 is slidably and sealingly disposed in the hollow member 30 with its one smaller diameter portion 32a projected into the larger diameter bore portion 18b of the casing 18. With this, the larger diameter bore portion 18b acts as an inlet chamber for the reason which will become clear hereinafter. A cylindrical valve body supporter 33 is securely fixed at its base portion to the smaller diameter portion 32a of the piston 32 to move therewith. The thickness of the supporter 33 is so selected as to provide the free piston 32 with a radially outwardly projected portion 32b. The portion 32b is engageable at its outside end with the inward flange portion 30b to suppress excess movement of the piston 32 in the rightward direction (leftward direction in case of the unit 16') relative to the casing 18. A valve body 34 is axially movably received in the valve supporter 33 with its head portion projectable therefrom toward the valve seat 29. A coil spring 36 is compressed between the valve body 34 and the free piston 32 to bias the valve body 34 toward the valve seat 29. An annular spring seat 37 is coaxially movably mounted on the base portion of the valve supporter 33. The width of the seat 37 is so selected as to contact both the shoulder portion 30a of the hollow member 30 and the projected portion 32b of the free piston 32 at the same time. Another coil spring 38 is compressed between the spring seat 37 and the before-mentioned annular spring seat 28 to bias them away from each other.

The valve casing 18 is formed at its radially opposed sides with inlet and outlet ports 18d and 18e which are open to the inlet chamber 18b of the casing 18. The inlet port 18d connects to the outlet port 12c (or 12b in the second valve unit 16') of the master cylinder 12. The outlet port 18e connects to a first oultet port 14b formed in the housing 14. With this, the outlet port 12c (or 12b) of the master cylinder 12 is constantly communicated with the first outlet port 14b, so that the master cylinder pressure $P_m$ is directly applied to the first oultet port 14b irrespective of magnitude thereof. The valve casing 18 has near the bottom of the bore thereof another outlet port 18f which connects the outlet chamber 22 with a second outlet port 14c formed in the housing 14.

Under the illustrated condition wherein the rightmost side of the free piston 32 is flush with that of the hollow member 30, the annular ridge 20d of the piston 20 is separated from the holder 24 by the distance of $L_1$, the projected portion 32b of the free piston 32 is separated from the inward flange portion 30b of the member 30 by $L_2$, the valve seat 29 is separated from the head of the valve body 34 by $L_3$, and a relation of $L_3 < L_1 < L_2 + L_3$ is established.

Assembly procedure of the valve 10' is as follows:

First, the valve unit 16 (16') is assembled in the following manner.

The piston 20 is inserted into the bore of the valve casing 18 and then the holder 24 and the seat member 26 are inserted in this order in the casing 18, sliding on the piston 20. The annular spring seat 28 having the valve seat 29 fixed thereto is then put on or screwed to the smallest diameter portion 20c of the piston 20. A unit consisting of the free piston 32, the valve supporter 33, the valve body 34 and the coil springs 36 which have been previously assembled is then put in the casing 18 with the coil spring 38 disposed between the spring seat 28 and the annular spring seat 37 which is previously mounted on the valve supporter 33. Then, the hollow member 30 is removably connected or screwed to the open end of the casing 18.

The two valve units 16 and 16' which have been assembled in the above-stated manner are then assembled in the housing 14 in the following manner.

First, the unit 16 is inserted into the housing 14 with the closed side of the casing 18 facing the bottom of the straight bore 14a of the housing 14, and is set in the left-half side of the bore 14a.

Then, the other unit 16' is inserted into the housing 14 with the hollow member 30' facing the unit 16, and is brought to a position where the hollow member 30' is in abutment with the hollow member 30 of the unit 16. A plug 42 is screwed to the open end of the bore 14a of the housing 14 to retain the units 16 and 16' in the housing 14 in the illustrated manner.

When the valve 10' is employed in a double piping braking system arranged, for example, in the X-piping manner, the first outlet port 14b is connected to the left-side front wheel brake cylinder, the other first outlet port 14b' to the right-side front wheel brake cylinder, the second outlet port 14c to the right-side rear wheel brake cylinder and the other second outlet port 14c' to the left-side rear wheel brake cylinder.

In the following, operation of the valve 10 will be described.

For facilitation, the description of the operation will be commenced with respect to the condition as shown in FIG. 1 wherein the valve units 16 and 16' are in their rest or inoperative conditions. Under this condition, the head of the valve body 34 (34') is separated by the distance of $L_3$ from the valve seat 29 (29') thereby communicating the inlet chamber 18b (18b') with the outlet chamber 22 (22') through the passage 20e (20e') of the piston 20 (20').

When now the brake pedal (not shown) is depressed to a certain extent for the purpose of braking the vehicle, the tandem master cylinder 12 produces master cylinder pressure $P_m$ at each of the outlet ports 12b and 12c thereof. The pressure $P_m$ is directly applied to both the front wheel brake cylinders as front wheel brake pressure $P_f$ through the constantly communicated inlet port 18d (18d'), inlet chamber 18b (18b'), outlet port 18e (18e') and first outlet port 14b (14b'), and thus brakes the front wheels. It is thus to be noted that the front wheel brake pressure $P_f$ is always equal to the master cylinder pressure $P_m$. At the same time, the master cylinder pressure $P_m$ at the outlet port 12c (12b) is directly applied to both the rear wheel brake cylinders as rear wheel brake pressure $P_r$ through the inlet port 18d (18d'), the inlet chamber 18b (18b'), the mouth of the valve seat 29 (29'), the passage 20e (20e') of the piston 20 (20'), the outlet chamber 22 (22') and the second outlet port 14c (14c'), and thus brakes the rear wheels. Accordingly, during this initial period, the rear wheel brake pressure $P_r$ increases at the same rate as the master cylinder pressure $P_m$, as is indicated by the line "a" in FIG. 2.

In order to facilitate the following description regarding the pressure control function of the valve 10, the sectional area at the largest diameter portion 20a (20a') of the piston 20 (20') will be designated by $S_1$, the sectional area of the medium diameter portion 20b (20b') by $S_2$, the sectional area of the mouth of the valve seat 29 (29') by $S_3$ which is smaller than $S_2$, the sectional area of the passage 20e (20e') of the piston 20 (20') by $S_4$, and the force generated by the spring 38 (38') by F. With these references, the force balance established at the piston 20 (20') is represented by the following equation:

$$(S_1-S_4)P_r-(S_3-S_4)P_r=(S_2-S_3)P_m+F$$

That is, $$(S_1-S_3)P_r=(S_2-S_3)P_m+F \quad (1)$$

In the above equation (1), the left term represents the force which is applied to the piston 20 (20') to bias the same rightward (or leftward in the second unit 16'), while, the right term represents the force which is applied to the piston to bias the same leftward (or rightward in the second unit 16').

Now, since $S_1$ is greater than $S_2$, and $P_r$ is equal to $P_m$ during the above-mentioned initial braking period, the following inquality is established:

$$(S_1-S_3)P_r>(S_2-S_3)P_m \quad (2)$$

Thus, during the initial period, the piston 20 (20') and thus the valve seat 29 (29') move gradually toward the valve body 34 (34') against the biasing spring 38 (38') as the master cylinder pressure $P_m$ increases.

When the master cylinder pressure $P_m$ reaches a predetermined valve (that is the critical pressure), the valve seat 29 (29') contacts the valve body 34 (34'), resulting in that the mouth of the valve seat 29 (29') being closed.

Thus, thereafter, the direct application of the master cylinder pressure $P_m$ to the rear wheel brake cylinders is suppressed, inducing a relation of $P_r \neq P_m$. In this condition, the rear wheel brake pressure $P_r$ is represented by the following equation:

$$P_r=(S_2-S_3)/(S_1-S_3)P_m+F/(S_1-S_3)$$

Figure 2:
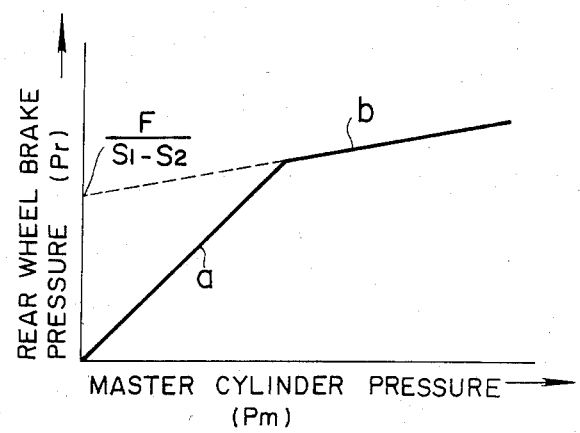
FIG. 2 is a graph showing the pressure control characteristics of the valve of the invention.

Now, since $S_2$ is greater than $S_3$, the rear wheel brake pressure $P_r$ increases thereafter at a rate lesser than that given until the master cylinder pressure $P_m$ reaches the critical pressure, as is indicated by the line "b" in FIG. 2. With this pressure control, the dangerous skid phenomenon wherein the rear wheels are locked prior to the front wheels during the braking is prevented.

When one system, for example, the system associated with the valve unit 16' fails to operate, the free piston 32 and thus the other free piston 32' are moved together rightward (in FIG. 1) by a distance of $L_2$ due to the pressure lack in the inlet chamber 18b'. At the same time, the master cylinder pressure $P_m$ urges the piston 20 rightward, that is, toward the valve body 34. However, because of the relation $L_1<L_2+L_3$ the valve seat 29 fails to contact the head of the valve body 34, leaving a clearance therebetween. Thus, under this condition, the master cylinder pressure $P_m$ is directly applied not only to the associated front wheel brake cylinder (left-side front wheel) but also to the associated rear wheel brake cylinder (right-side rear wheel) without carrying out the pressure control.

When, now, the brake pedal (not shown) is released rapidly and produces a pressure difference between the inlet chambers 18b and 18b', inducing that, for example, the pressure in the chamber 18b' becomes lower than that in the chamber 18b, the free pistons 32 and 32' are moved rightward in the drawing by a certain distance against the force of the spring 38'. It is now to be noted that the movements of the free pistons 32 and 32' thus effected are not promoted by the spring 38. This is because, under this condition, the annular spring seat 37 for the spring 38 is prevented from moving by the shoulder portion 30a of the hollow member 30. This means that the leftward or centering movements of the free pistons 32 and 32' which follow can be achieved without obstruction by the spring 38. (In the afore-mentioned brake pressure control valve disclosed in Japanese Patent Application Nos. 56-186220 & 56-186221, the centering movements of the corresponding free pistons are carried out against the obstruction of a spring corresponding to the spring 38 or 38'.) Thus, the self-centering movements of the pistons 32 and 32' in the present invention are instantly and quickly effected.

Now, if desired, each coil spring 38 or 38' may be arranged and constructed to assume a non-stressed state (viz., not compressed or stretched) when the valve 10 is in its rest condition.

What is claimed is:

1. A brake pressure control valve for a double piping hydraulic braking system, comprising:
   a housing having a bore formed therein;
   a pair of substantially identical valve units coaxially and symmetrically arranged in said bore, each valve unit including a valve body, a pressure control piston and a spring, and being constructed to produce a controlled outlet hydraulic pressure in accordance with the magnitude of a hydraulic pressure applied thereto;

a pair of free pistons respectively associated with the paired value units and contacting each other to be movable therewith, said free pistons supporting the associated valve bodies and one end of the associated springs to cause one of said valve units to produce, when the other valve unit fails to operate, an outlet hydraulic pressure which is equal to the applied pressure in magnitude; and a self-centering promoting means which causes each of the springs to apply no force to the corresponding free piston when said corresponding free piston moves away from its home position toward the other of said free pistons, said self-centering promoting means comprising:

associated with said each valve unit:

a valve casing;

a hollow member retained in said casing to retain substantially all essential parts of the associated valve unit in the casing, said hollow member having a shoulder portion which protrudes into the interior of said casing;

a radially outwardly projected portion of the associated free piston being axially slidably received in said hollow member, said associated free piston having an outside end contacting the other free piston of said pair of free pistons; and an annular spring seat on which said one end of said spring is seated, said spring seat being in abutment with both said shoulder portion and said radially outwardly projected portion at the same time when said associated piston assumes its home position.

2. A brake pressure control valve as claimed in claim 1, in which said hollow member is formed with a radially inwardly projected portion to which said radially outwardly projected portion of the associated free piston is engageable to limit the axially outward displacement of the associated free piston relative to the casing.

3. A brake pressure control valve as claimed in claim 1, in which said pressure control piston is formed with an axially extending through passage which connects hydraulic pressure inlet and outlet ports of said valve unit when said valve body is disengaged from a mouth portion of said through passage.

4. A brake pressure control valve as claimed in claim 3, in which said each valve unit further comprises:

an annular spring seat coaxially and removably mounted on a mouth portion of said pressure control piston to support thereon the other end of said spring; and a valve seat fixed to said annular spring seat so that, upon engagement with said valve body, said through passage of the pressure control piston is closed, and, upon disengagement with said valve body, said through passage is open.

5. A brake pressure control valve as claimed in claim 4, in which said each valve unit further comprises:

a cylindrical valve body supporter coaxially connected at its base portion to the associated free piston to be movable therewith and containing therein said valve body; and a spring compressed between said valve body and said associated free pistons to bias said valve body causing a head of said valve body to be projected outwardly from said supporter toward said valve seat.

6. A brake pressure control valve as claimed in claim 5, in which said hollow member is formed with a radially inwardly projected portion to which said radially outwardly projected portion of the associated free piston is engageable to limit the axially outward displacement of the free piston relative to the casing.

* * * * *